(12) United States Patent
Sadeh (10) Patent No.: US 7,224,841 B2
(45) Date of Patent: May 29, 2007

(54) METHOD AND APPARATUS FOR ACCELERATING VARIABLE LENGTH CODING (VLC) DECODING IN THE PROCESS OF INVERSE DISCRETE COSINE TRANSFORMATION (IDCT)

(75) Inventor: Yaron M. Sadeh, Kfar Saba (IL)

(73) Assignee: Parthusceva Ltd., Herzlia (IL)

( * ) Notice: Subject to any disclaimer, the term of this patent is extended or adjusted under 35 U.S.C. 154(b) by 595 days.

(21) Appl. No.: 10/282,164

(22) Filed: Oct. 29, 2002

(65) Prior Publication Data

US 2003/0081844 A1 May 1, 2003

Related U.S. Application Data

(60) Provisional application No. 60/330,701, filed on Oct. 29, 2001.

(51) Int. Cl.
*G06K 9/36* (2006.01)
*G06K 9/46* (2006.01)

(52) U.S. Cl. ........................ 382/233; 382/250

(58) Field of Classification Search ................. 382/233
See application file for complete search history.

(56) References Cited

U.S. PATENT DOCUMENTS

| 5,038,390 A | * | 8/1991 | Ravi Chandran | ........... 382/248 |
| 5,224,062 A | | 6/1993 | McMillan, Jr. et al. | |
| 5,295,203 A | * | 3/1994 | Krause et al. | ............... 382/248 |
| 5,650,905 A | * | 7/1997 | Bakhmutsky | ................. 341/67 |
| 5,729,484 A | * | 3/1998 | Mack et al. | ................. 708/400 |
| 6,002,801 A | * | 12/1999 | Strongin et al. | ............. 382/233 |
| 6,112,219 A | * | 8/2000 | Girod et al. | ................. 708/402 |

FOREIGN PATENT DOCUMENTS

EP 0 701 376 A2 3/1996

OTHER PUBLICATIONS

Zheng Baoyu, "A new algorithm for the 2-D discrete cosine transform", Signal Processing Proceedings, 1998. ICSP '98. 1998 Fourth International Conference on Oct. 12-16, 1998 pp. 85-88 vol. 1.*
Manduca, A, "Compressing images with wavelet/subband coding", Engineering in Medicine and Biology Magazine, IEEE vol. 14, Issue 5, Sep.-Oct. 1995 pp. 639-646.*
Hartwig, S.; Luck, M.; Aaltonen, J.; Serafat, R.; Theimer, W.; Consumer Electronics, IEEE Transactions on vol. 46, Issue 4, Nov. 2000 pp. 1167-1178.*
Liu, S. et al., "Look-Up-Table Based DCT Domain Inverse Motion Compensation", Proceedings 2001 International Conference on Image Processing, ICIP 2001, Thessaloniki, Greece, Oct. 7-10, 2001, International Conference on Image Processing, New York, NY: IEEE, US, vol. 2 of 3, Conf. 8, pp. 965-968.
Allen, J.D., "An Approach to Fast Transform Cofing in Software", Signal Processing, Image Communication, Elsevier Science Publlishers, Amsterdam, NL, vol. 8, No. 1, 1996, pp. 3-11.

* cited by examiner

*Primary Examiner*—Jingge Wu
*Assistant Examiner*—Yuzhen Ge
(74) *Attorney, Agent, or Firm*—Pearl Cohen Zedek Latzer, LLP (57) ABSTRACT

In some embodiments of the present invention, frequently occurring inverse linear transform results are calculated and stored in look-up-tables. In real time, incoming blocks of linear transform coefficients are divided into two or more groups. A numerical code is determined for each group and checked against a look-up-table for that group to see whether it corresponds to a pre-calculated inverse linear transform result.

39 Claims, 7 Drawing Sheets

METHOD AND APPARATUS FOR ACCELERATING VARIABLE LENGTH CODING (VLC) DECODING IN THE PROCESS OF INVERSE DISCRETE COSINE TRANSFORMATION (IDCT)

CROSS-REFERENCE TO RELATED APPLICATIONS

This application claims the benefit of provisional patent application Ser. No. 60/330,701 entitled "IMPROVED DECODER PERFORMANCE BY STORING FREQUENTLY OCCURRING IDCT RESULTS" and filed Oct. 29, 2001.

BACKGROUND OF THE INVENTION

In order to reduce the huge amount of data required for accurate description of images, audio and video, various compression techniques have been developed. Many of these compression techniques involve linear transformations. For example, in the Moving Picture Experts Group (MPEG) standards, the discrete cosine transform (DCT) is used. Decoding video encoded by an MPEG encoder involves, among other things, performing inverse discrete cosine transformations (IDCT). Similarly, data compressed with linear transformations will be decompressed using inverse linear transformations.

Algorithms to perform inverse linear transformations can be time-consuming and may place a burden on the data system. Therefore, it would be beneficial to reduce the amount of time spent on such calculations.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features and advantages thereof, may best be understood by reference to the following detailed description when read with the accompanied drawings in which:

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION OF EMBODIMENTS OF THE INVENTION

In the following detailed description, numerous specific details are set forth in order to provide a thorough understanding of the invention. However it will be understood by those of ordinary skill in the art that the present invention may be practiced without these specific details. In other instances, well-known methods, procedures, components and circuits have not been described in detail so as not to obscure the present invention.

Some portions of the detailed description that follows are presented in terms of algorithms and symbolic representations of operations on data bits or binary digital signals within a computer memory. These algorithmic descriptions and representations may be the techniques used by those skilled in the data processing arts to convey the substance of their work to others skilled in the art.

Some embodiments of the present invention relate to decoding of compressed data. If the data has been compressed using a linear transform, applying the inverse linear transform to the compressed data is generally required during decoding. However, decoding may be accelerated by bypassing the application of the inverse linear transform for certain inputs of compressed data. If portions of the compressed data may be identified as being identical to compressed data for which the inverse linear transform results have been pre-computed and stored, then the stored results may be used instead of applying the inverse linear transform to these portions. As an example, if the stored results correspond to linear transform coefficients that are frequently occurring in the compressed version of data streams of interest, then some savings in decoding time may be achieved.

Methods according to some embodiments of the present invention may be performed by any suitable computing unit, including but not limited to the central processing unit of a computer, a processor, a digital signal processor, dedicated hardware, or any combination of the above. Software code representing the method may be stored in memory accessible by the computing unit.

An apparatus comprising a computing unit to perform methods according to some embodiments of the present invention may be part of a compressed data decoder. Although the scope of the present invention is not limited in this respect, in the particular example of compressed video, the decoder may be part of a set-top box that is either battery-operated or not battery-operated, a digital video disc (DVD) player having one or more disc trays, a digital video camera having a screen to display video play-back, a multimedia-enabled cellular telephone having a color display screen or a monochrome display screen, a multimedia-enabled wireless personal digital assistant (PDA) having a color display screen or a monochrome display screen, etc.

Figure 1:
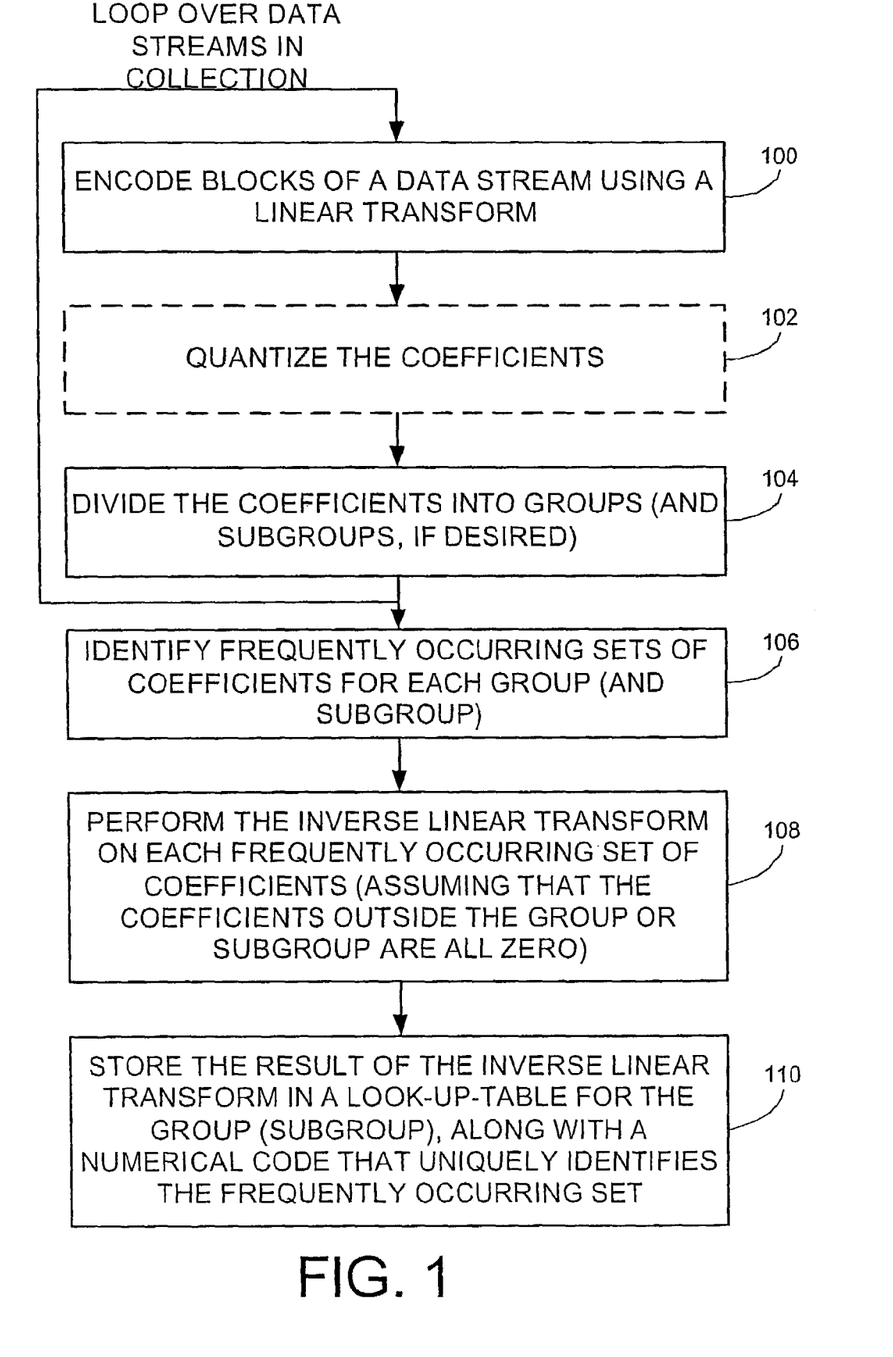
FIG. 1 is a flowchart illustration of a method of calculating and storing inverse linear transform results, according to an embodiment of the present invention.

Reference is made to FIG. 1, which is a flowchart illustration of a method of calculating and storing inverse linear transform results according to an embodiment of the present invention. This method is performed on data streams in a collection. The collection may be selected in order to properly represent the data streams that are expected to be decoded by a decoder according to an embodiment of the invention, for example raw video samples or raw audio samples. The collection may be of a size that is sufficiently large statistically, depending on the desired statistics. Although the scope of the present invention is not limited in this respect, a collection of at least 10 streams each at least 30 seconds long and containing diverse material (which in the case of video streams includes high detail, fast motion, etc.) may be sufficient to obtain enough statistical data to have a clear convergence for the frequent combinations. Blocks of a data stream are encoded using a linear transform (block 100), thus producing coefficients. Optionally, the coefficients may be quantized (block 102). The coefficients are divided into two or more separate groups, and the groups may be further divided into two or more separate subgroups (block 104). For each group and subgroup, frequently occurring sets of coefficients are identified (block 106). For each frequently occurring set of coefficients, the inverse linear transform is performed as if all other coefficients outside the group or subgroup are zero (block 108). The result of the inverse linear transform is stored in a look-up-table (LUT) for the group or subgroup, along with a numerical code that identifies the frequently occurring set (block 110). The numerical code may be used as an index to the LUT.

The method of FIG. 1 will now be explained in greater detail with respect to FIGS. 2-7 using the specific example of video streams, where the blocks are 8×8 arrays of signal amplitudes for picture elements (pixels) and the linear transform applied to these blocks is a discrete cosine transform (DCT). It will be understood by persons of ordinary skill in the art that the method of FIG. 1 is equally applicable to any data stream to blocks of which a linear transform is applied. For example, the linear transform may be the Fast Fourier Transform (FFT), the discrete wavelet transform (DWT), and the like. Moreover, the result of the inverse linear transform and the numerical code need not be stored in a LUT, rather any suitable storage arrangement is within the scope of the present invention.

Figure 2:
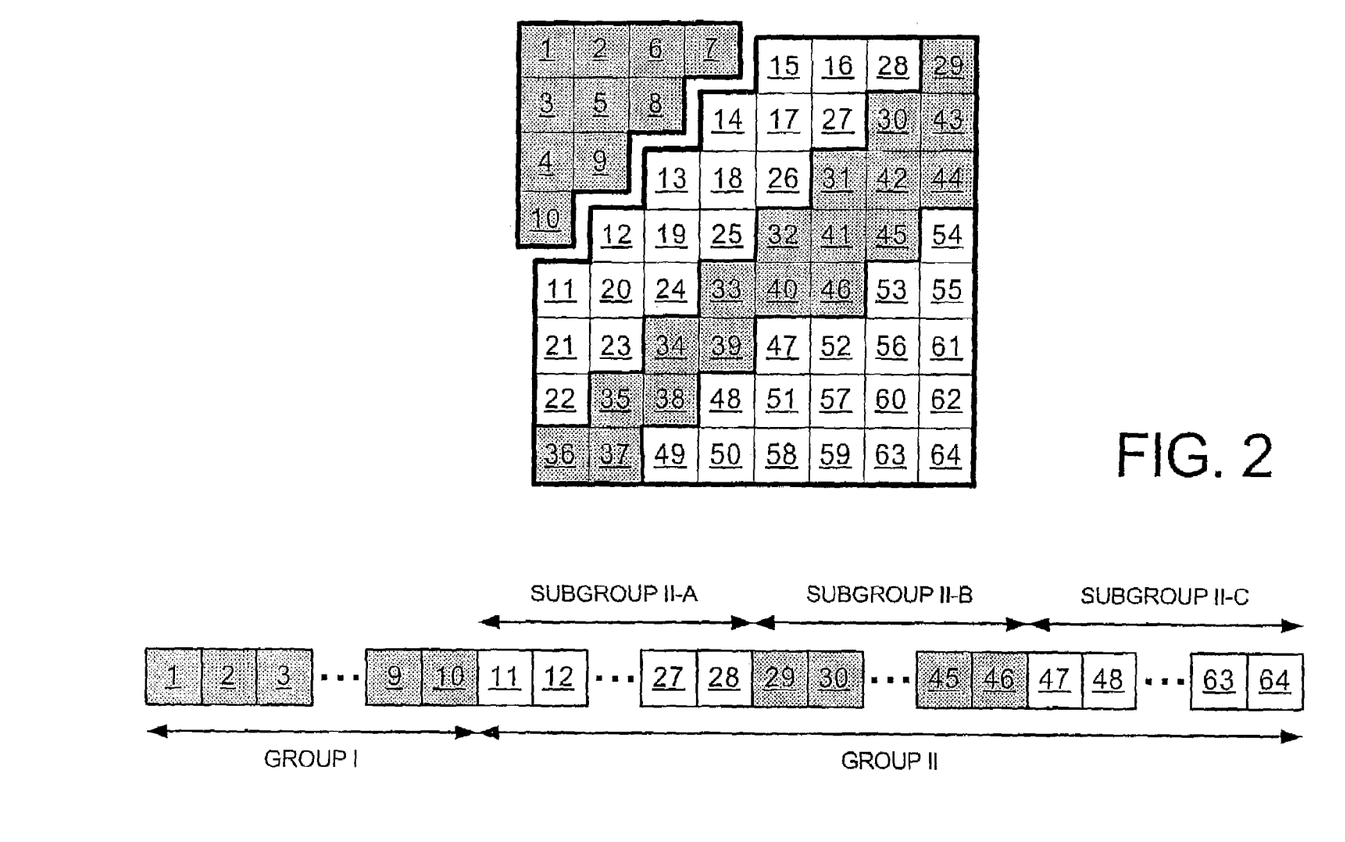
FIG. 2 is a simplified illustration of 64 quantized discrete cosine transform (DCT) coefficients divided into groups and subgroups according to an embodiment of the present invention.

The precise values of the examples shown in FIGS. 2 relate to video streams compatible with the MPEG-2 standard and involve Non-Intra frames using the default quantization matrix for Non-Intra (all quantization values of the 8×8 quantization matrix equal 16) and a quantization scale of 16.

During MPEG encoding, an 8×8 array of signal amplitudes of pixels is converted into an 8×8 array of frequency component amplitudes, also known as DCT coefficients. These DCT coefficients are quantized and then reordered using what is commonly known as a "zigzag" algorithm, so that the low frequency components precede the high frequency components. FIG. 2 shows the 8×8 array of quantized DCT coefficients labeled 1 to 64 in the order in which the zigzag algorithm may order them. The reordered DCT coefficients appear sequentially below.

In order to build the tables, the 64 quantized DCT coefficients are divided into two groups, Group I and Group II. Group I comprises coefficients 1 through 10, while Group II comprises coefficients 11 through 64. Group II is subdivided into three subgroups of 18 coefficients each: subgroup II-A comprises coefficients 11 through 28, subgroup II-B comprises coefficients 29 through 46, and subgroup II-C comprises coefficients 47 through 64.

Figure 3:
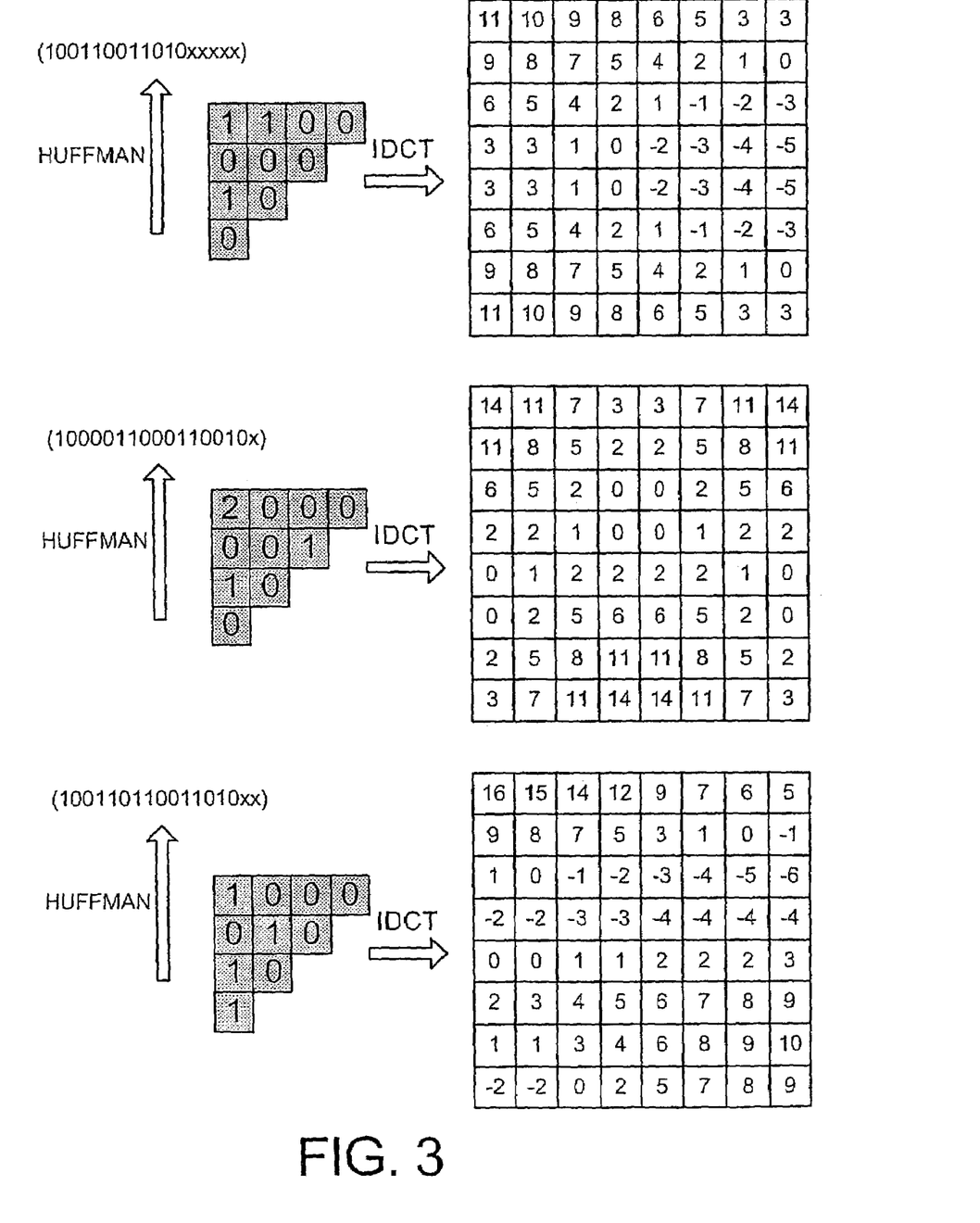
FIG. 3 is a simplified illustration of exemplary sets of coefficients 1 through 10 resulting from processing of a collection of video streams, numerical codes for these exemplary sets and the 64 pixel signal amplitudes corresponding to the sets.

A collection of video streams that is sufficiently large statistically is processed and the most frequently occurring combinations of coefficients are identified. The combinations may be identified on a group-by-group basis or as a whole. Depending on the desired statistics, the list of most frequently occurring sets of coefficients 1 through 10 (Group I) may number a few hundred or a few thousand. Three exemplary sets of coefficients are shown in FIG. 3. For each set of coefficients in the list, the inverse quantization and IDCT is performed as if the coefficients 11 through 64 were all zero. The resulting 64 pixel signal amplitudes, illustrated an 8×8 array of squares, are stored in a LUT for Group I, indexed by a numerical code that identifies the set of coefficients 1 through 10 on which the IDCT was performed. In an example that will be described in more detail hereinbelow, if the video streams are compliant with the MPEG-2 standard, then the first 12 to 17 bits of the Huffman coding of the set of coefficients may be used for the numerical code, where "x" in the numerical code indicates irrelevant bits that do not result from the Huffman coding of the first 10 coefficients.

Figure 4:
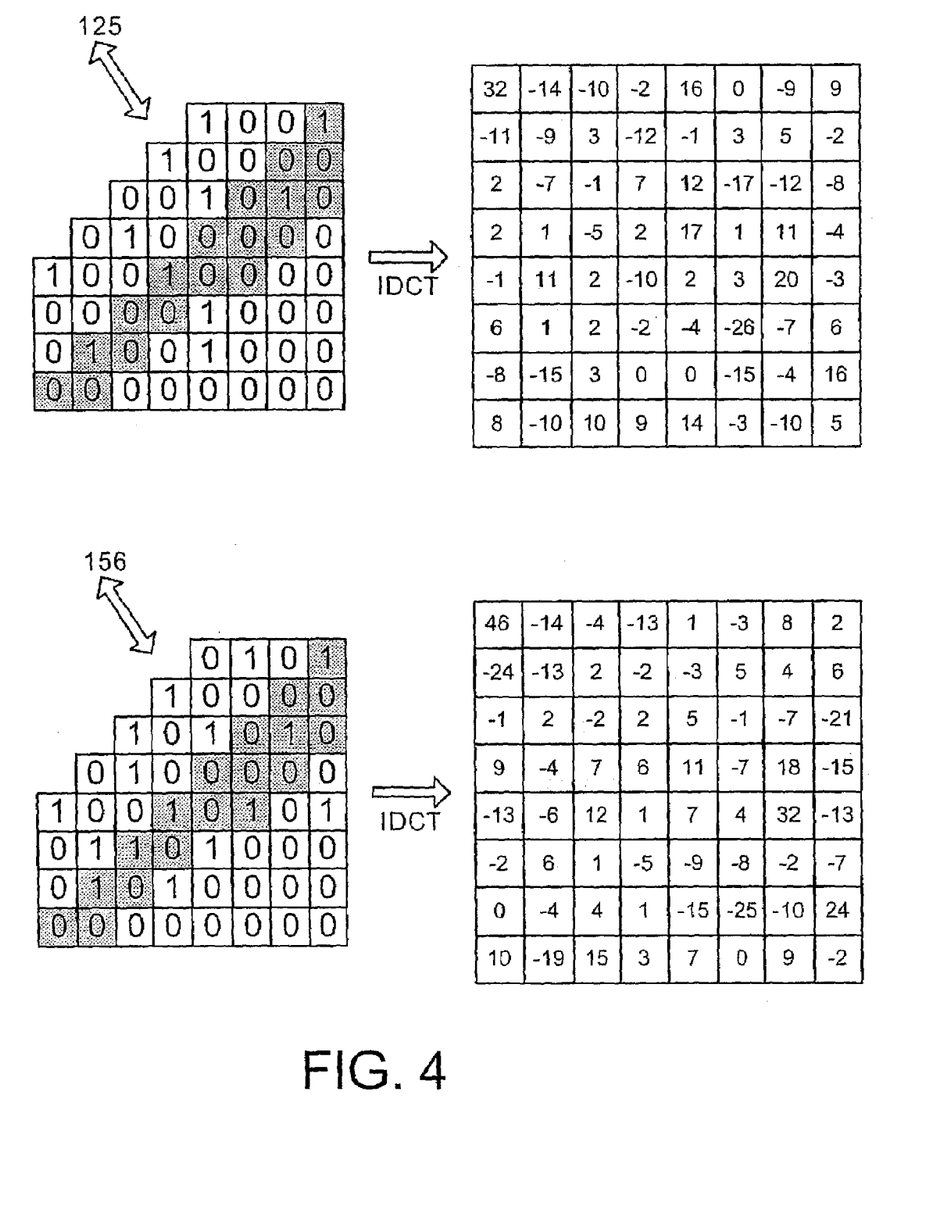
FIG. 4 is a simplified illustration of exemplary sets of coefficients 11 through 64 resulting from processing of a collection of video streams, numerical codes for these exemplary sets and the 64 pixel signal amplitudes corresponding to the sets.

In the same manner, the list of most frequently occurring sets of coefficients 11 through 64 (Group II) is determined. Two exemplary sets of coefficients are shown in FIG. 4. For each set of coefficients in the list, the inverse quantization and IDCT is performed as if the coefficients 1 through 10 were all zero. The resulting 64 pixel signal amplitudes, illustrated as an 8×8 array of squares, are stored in a LUT for Group II, indexed by a numerical code that identifies the set of coefficients 11 through 64 on which the IDCT was performed. For example, numerical code 0 identifies the case where all the coefficients from 11 to 64 are zero, numerical code 1 identifies the case where the $11_{th}$ coefficient is 1 and coefficients 12 to 64 are zero, etc. The first exemplary set of coefficients in FIG. 4 has a numerical code of 125 and the second set has a numerical code of 156.

Figure 5A:
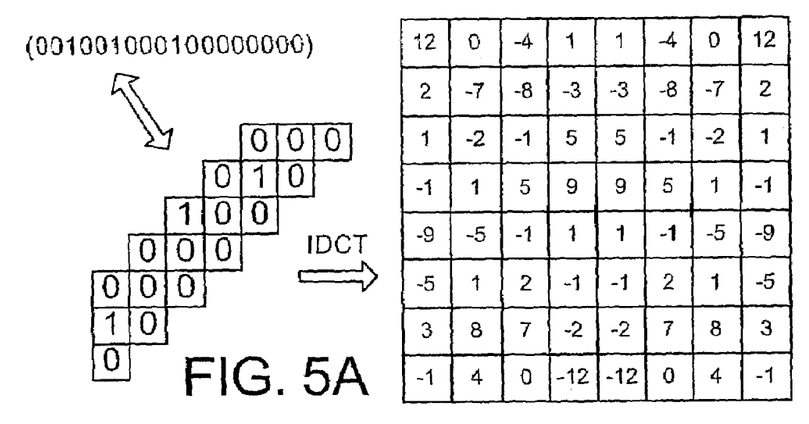
FIG. 5A is a simplified illustration of an exemplary set of coefficients 11 through 28 resulting from processing of a collection of video streams, numerical codes for this exemplary set and the 64 pixel signal amplitudes corresponding to the set.

Similarly, the list of most frequently occurring sets of coefficients 11 through 28 is determined. One exemplary set of coefficients is shown in FIG. 5A. For each set of coefficients in the list, the inverse quantization and IDCT is performed as if the coefficients 1 through 10 and 29 through 64 were all zero. The resulting 64 pixel signal amplitudes, illustrated as an 8×8 array of squares, are stored in a LUT for Subgroup II-A, indexed by a numerical code that identifies the set of coefficients 11 through 28 on which the IDCT was performed. For example, if the set of coefficients 11 through 28 are restricted to absolute values of 0 and 1 only, then the set may be represented by an 18-bit number, not including the sign of the coefficients. In the example shown in FIG. 5A, the numerical code is (001001000100000000).

Figure 5B:
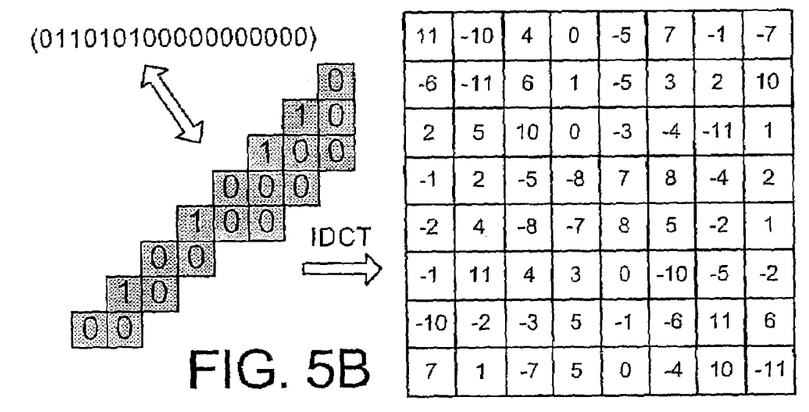
FIG. 5B is a simplified illustration of an exemplary set of coefficients 29 through 46 resulting from processing of a collection of video streams, numerical codes for this exemplary set and the 64 pixel signal amplitudes corresponding to the set.

Similarly, the list of most frequently occurring sets of coefficients 29 through 46 is determined. One exemplary set of coefficients and its numerical code, (011010100000000000), is shown in FIG. 5B. For each set of coefficients in the list, the inverse quantization and ADCT is performed as if the coefficients 1 through 28 and 47 through 64 were all zero. The resulting 64 pixel signal amplitudes, illustrated as an 8×8 array of squares, are stored in a LUT for Subgroup II-B, indexed by the numerical code.

Figure 5C:
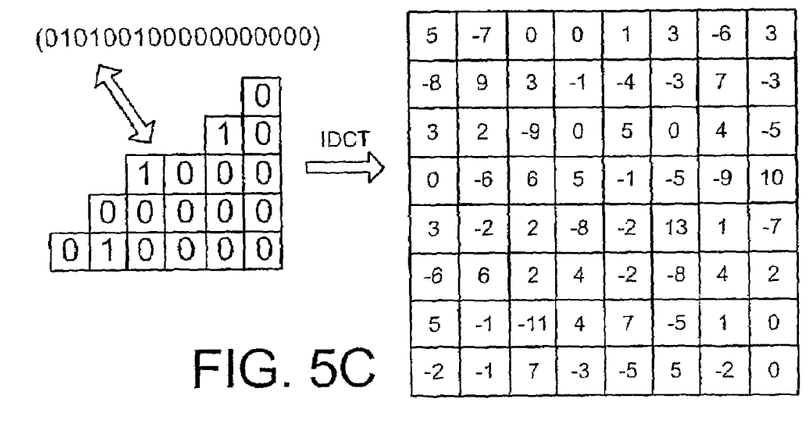
FIG. 5C is a simplified illustration of an exemplary set of coefficients 47 through 64 resulting from processing of a collection of video streams, numerical codes for this exemplary set and the 64 pixel signal amplitudes corresponding to the set.

Finally, the list of most frequently occurring sets of coefficients 47 through 64 is determined. One exemplary sets of coefficients and its numerical code, (010100100000000000), is shown in FIG. 5C. For each set of coefficients in the list, the inverse quantization and IDCT is performed as if the coefficients 1 through 46 were all zero. The resulting 64 pixel signal amplitudes, illustrated as an 8×8 array of squares, are stored in a LUT for Subgroup II-C, indexed by the numerical code.

It will be appreciated by persons of ordinary skill that the division of the coefficients into groups and subgroups as described hereinabove is merely an example, and other divisions of the coefficients are within the scope of the present invention. Moreover, the numerical codes described hereinabove are merely examples, and other suitable identifiers of the sets of frequently occurring coefficients are within the scope of the present invention. Although the scope of the present invention is not limited in this respect, the look-up-tables for the various groups and subgroups may be stored in random-access-memory (RAM) or read-only-memory (ROM).

Figure 6A:
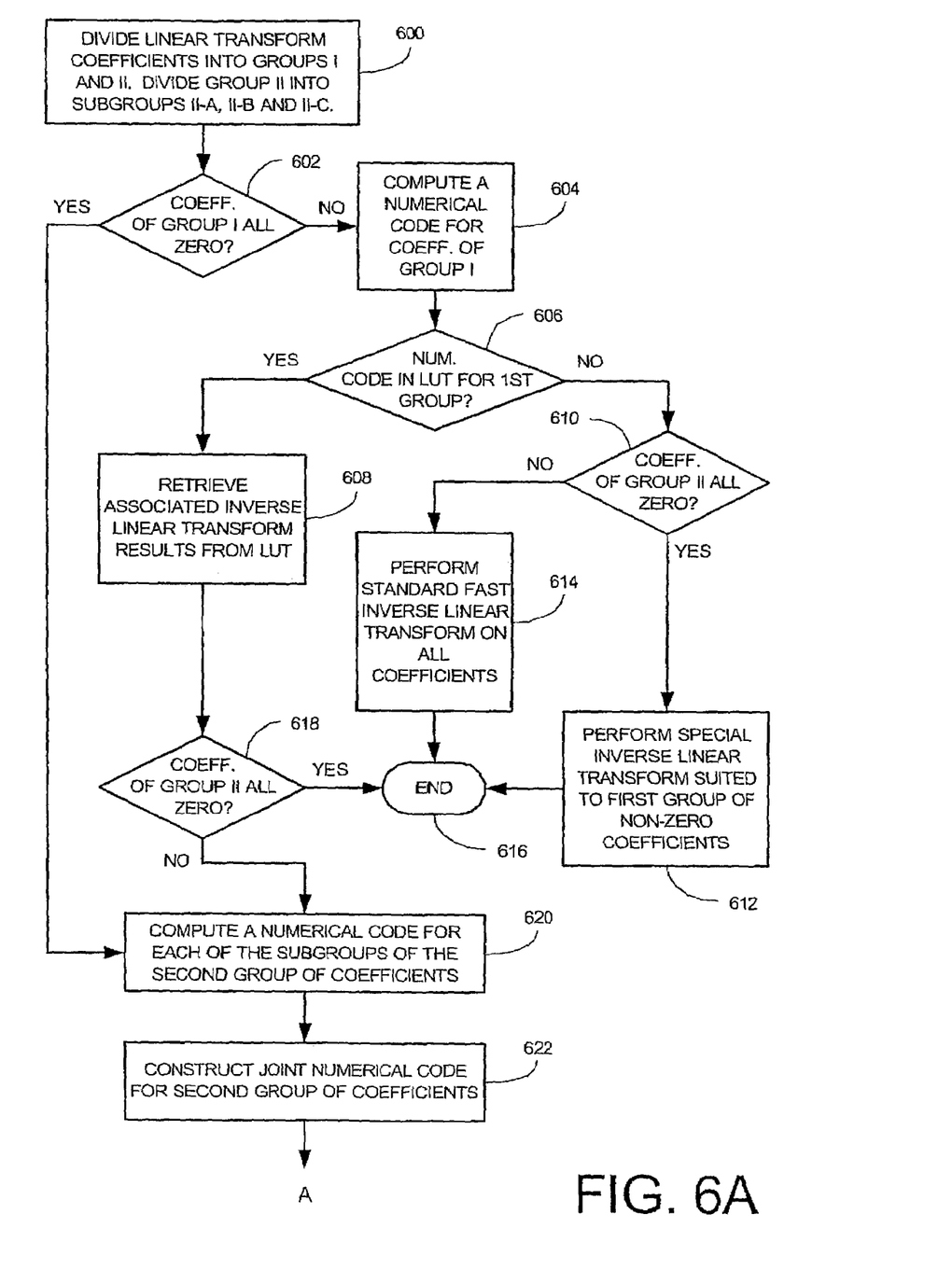
FIGS. 6A and 6B are flowchart illustrations of a method of determining the inverse linear transform of a block of linear transform coefficients, according to an embodiment of the present invention.
Figure 6B:
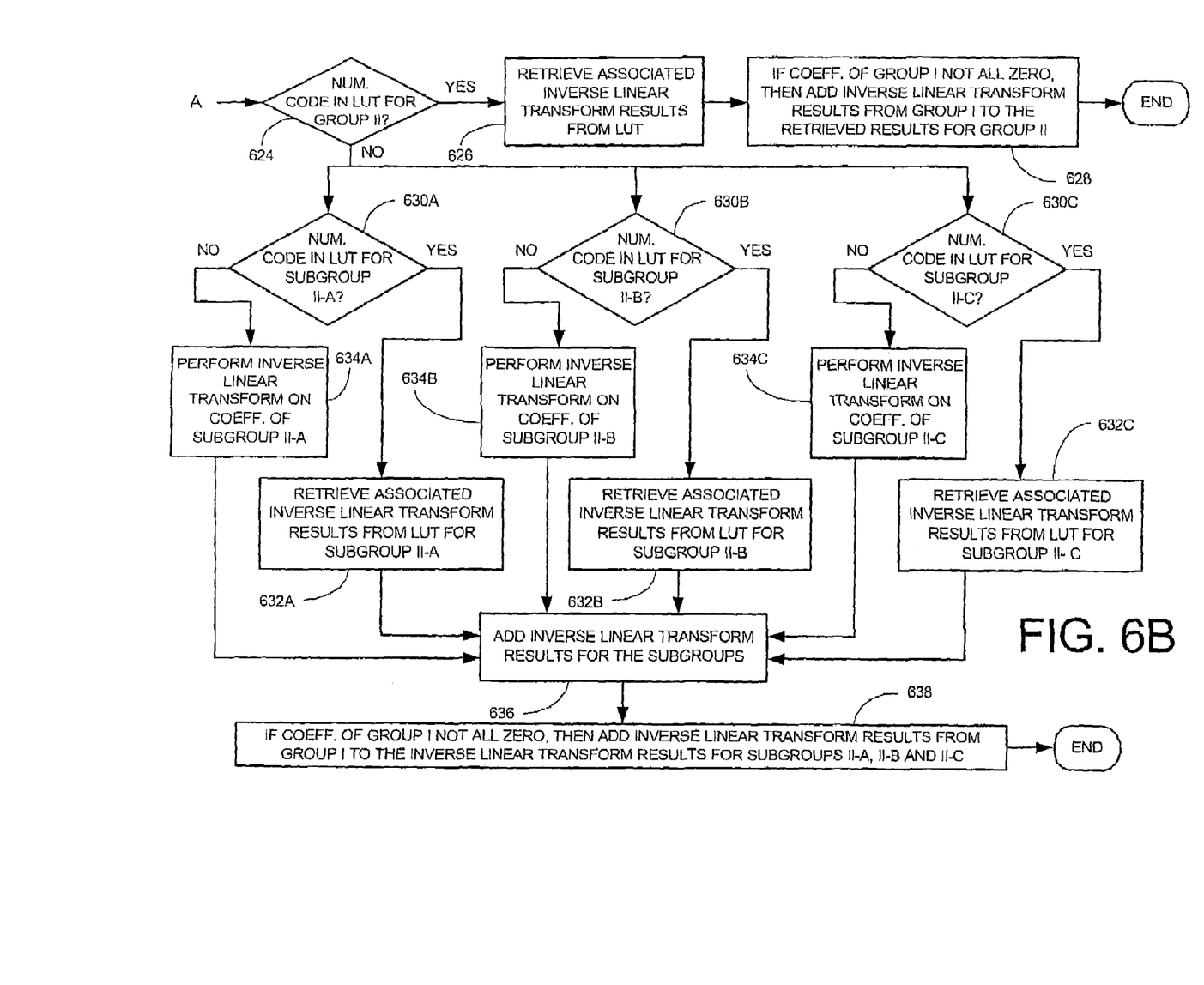

Reference is now made to FIGS. 6A and 6B, which are flowchart illustrations of a method of determining the inverse linear transform of a block of linear transform coefficients, according to an embodiment of the present invention.

The block of linear transform coefficients is divided into groups, and possibly into sub-groups (block 600). For example, the groups (and subgroups) may be as illustrated in FIG. 2. It is this particular, non-limiting, example that will be discussed hereinbelow.

If the coefficients of Group I are all of zero value (block 602), then the method will continue from block 620. Otherwise, a numerical code is computed for the coefficients of Group I (block 604).

If the numerical code is not found in the LUT for Group I (block 606), then inverse quantization is performed and then an inverse linear transform is applied. If the coefficients of Group II are all zero (block 610), then the inverse linear transform applied may be specially suited to the first group of coefficients (block 612). If the coefficients of Group II are not all zero (block 610), then a standard fast inverse linear transform may be applied to all the coefficients of the block (block 614). In either case, the results of the inverse linear transform are the desired results for the entire block, so the method ends (block 616).

If the numerical code is found in the LUT for Group I (block 606), then the associated inverse linear transform results stored in the LUT and indexed by the numerical code are retrieved (block 608). If the coefficients of Group II are all zero (block 618), then the results retrieved in block 608 are the desired results for the entire block so the method ends (block 616). If the coefficients of Group II are not all zero (block 618), then a numerical code is computed for each of the subgroups of Group II (block 620), and from these codes, a joint numerical code is constructed (block 622).

If the joint numerical code is found in the LUT for Group II (block 624), then the associated inverse linear transform results stored in the LUT and indexed by the joint numerical code are retrieved (block 626). If the coefficients of Group I are all zero, then the method ends. If the coefficients of Group I are not all zero, then the retrieved results for Group I and the retrieved results for Group II are added (block 628) and the method ends.

If the joint numerical code is not found in the LUT for Group II (block 624), then the numerical codes for each of the subgroups are checked (blocks 630A, 6303B, 630C). If the numerical code is found in the LUT for the subgroup, then the associated inverse linear transform results stored in the LUT and indexed by the numerical code are retrieved (blocks 632A, 632B, 632C). If the numerical code is not found in the LUT for the subgroup, then inverse quantization and an inverse linear transform are performed on the coefficients of the subgroup, as if all other coefficients are zero (blocks 634A, 634B, 634C).

The inverse linear transform results for the different subgroups are combined (block 636). If the coefficients of Group I are all zero, then the method ends. If the coefficients of Group I are not all zero, then the retrieved results for Group I and the results from block 636 are added (block 638) and the method ends.

It will be appreciated by persons of ordinary skill in the art that many alternatives to the exemplary method described hereinabove with respect to FIGS. 6A and 6B exist, while remaining within the scope of the invention. For example, if more than one subgroup of Group II has non-zero coefficients that are not expressed in a numerical code, then rather than performing the inverse linear transform separately on each subgroup, it may be performed once on the combination of the coefficients of the subgroups.

The numerical code example for the set of coefficients 1 through 10 will now be described. In the example, the video streams are compliant with the MPEG-2 standard, and it was found that the first 17 bits of the Huffman coding of the set of coefficients may be used for the numerical code. It will be appreciated by persons of ordinary skill in the art that to keep a table indexed by all 131,072 ($2^{17}$) possible 17-bit numbers is impractical, especially when the number of frequently occurring sets of coefficients 1 through 10 is significantly less than this number.

The number N of frequently occurring sets of coefficients 1 through 10 for which inverse linear transform results will be stored in a LUT is selected to provide the desired statistics. For example, 300 sets may be sufficient to account for approximately 80% of the sets of coefficients 1 through 10 that will be decoded. Therefore, according to an embodiment of the present invention, a main LUT indexed with the values 1 through N and comprising the inverse linear transform results for each of these N frequently occurring sets of coefficients 1 through 10 may be maintained.

In order to identify for a given set of coefficients 1 through 10 whether it is one of the N sets for which inverse linear transform results are stored in the main LUT, a numerical code based on the Huffman coding is used. The first 12 Huffman bits are determined for the given set of coefficients 1 through 10. A first preliminary LUT is indexed by all 4096 ($2^{12}$) possible 12-bit numbers. Since N is likely significantly less than 4096, for many 12-bit numbers the first preliminary LUT comprises an indication that the main LUT does not include inverse linear transform results for that particular 12-bit number. For other 12-bit numbers, the first preliminary LUT comprises a number n between 1 and N and an indication whether an additional 5 bits need to be read in order to uniquely identify the set of coefficients whose inverse linear transform results are stored in the main LUT. If no more Huffman bits need to be read, then the number n is the index to be used in the main LUT. For M of the N frequently occurring sets, an additional 5 bits need to be read.

A second preliminary LUT is indexed by all $2^5$M possible pairs of the number n (between 1 and M) and the additional 5 Huffman bits. For most of these indices, the second preliminary LUT comprises an indication that the main LUT does not include inverse linear transform results for that particular pair. For other indices, the second preliminary LUT comprises a number n' between 1 and N that is the index to be used in the main LUT.

It will be appreciated by persons of ordinary skill in the art that the LUTs required for the Huffman-coding example described hereinabove are of the following dimensions: dim(main LUT)=N×(enough space for 64 IDCT results); dim(first preliminary LUT)=4096×(enough space for the code and the indicator); and dim(second preliminary LUT) =32M×(enough space for the code and the indicator).

As mentioned hereinabove, savings in decoding time may result from using some embodiments of the present invention. In a particular example, a collection of MPEG-2 video streams was used to prepare the look-up-tables of numerical codes and IDCT results for the groups I and II and subgroups II-A, II-B, and II-C described hereinabove. The raw video streams were taken from the International Radio Consultative Committee (CCIR) sources CCIR 15, 30, 36 and 39. During decoding of these and other video streams, it was found that approximately 30% of the blocks in I-frames and 70% of the blocks in P and B-frames had non-zero DCT coefficients only for the first 10 coefficients, and therefore could have their IDCT results computed merely by retrieving them from the LUT for group I or by a fast IDCT calculation designed for the first 10 coefficients. It was also found that approximately 90% of the blocks in P and B-frames and approximately 70–80% of the blocks in I-frames could have their IDCT results computed by retrieving results from the LUT for group I and from the LUT for group II and adding the results. It was also found that using LUTs for the subgroups slightly increased the number of blocks for which IDCT results could be retrieved instead of computed directly.

While certain features of the invention have been illustrated and described herein, many modifications, substitutions, changes, and equivalents will now occur to those of ordinary skill in the art. It is, therefore, to be understood that the appended claims are intended to cover all such modifications and changes as fall within the true spirit of the invention.

What is claimed is:

1. A method comprising:
    dividing blocks of linear transform coefficients into two or more separate groups, said blocks belonging to a collection of data streams; and
    for at least one group of said groups,
        identifying sets of linear transform coefficients that occur frequently in said collection without separately identifying particular linear transform coefficients within each of said sets, each set includes a plurality of linear transform coefficients, each of said sets of coefficients is expressed as a combination of variable-length codes appearing in said data streams; and
        for each of said frequently occurring sets,
            assigning a numerical code that uniquely identifies said set based on the combination of variable-length codes associated with said set;
            applying an inverse linear transform to the coefficients in said frequently occurring set; and
            storing results of said inverse linear transform indexed by said numerical code.

2. The method of claim 1, wherein applying the inverse linear transform to the coefficients in said frequently occurring set comprises using zero values for the coefficients of groups other than said group.

3. The method of claim 1, wherein said linear transform coefficients are quantized linear transform coefficients.

4. The method of claim 1, wherein said data streams are video streams.

5. The method of claim 1, wherein said linear transform coefficients are discrete cosine transform coefficients and said inverse linear transform is an inverse discrete cosine transform.

6. The method of claim 1, wherein said linear transform coefficients are fast Fourier transform coefficients and said inverse linear transform is an inverse fast Fourier transform.

7. The method of claim 1, wherein said linear transform coefficients are discrete wavelet transform coefficients and said inverse linear transform is an inverse discrete wavelet transform.

8. The method of claim 1, wherein the linear transform coefficients of a first of said two or more groups represent lower frequencies than the linear transform coefficients of a second of said two or more groups.

9. A method comprising:
    for a collection of data streams comprising blocks of linear transform coefficients, dividing said blocks into two or more separate groups; and
    for each of said groups:
        identifying frequently occurring sets of linear transform coefficients without separately identifying particular linear transform coefficients within each of said sets, each set includes a plurality of linear transform coefficients, each of said sets of coefficients is expressed as a combination of variable-length codes appearing in said data streams; and
        storing each combination of the variable-length codes to be used as an index; and
    for at least one set of said frequently occurring sets:
        determining from the combination of said variable-length codes a numerical code that identifies said set;
        applying an inverse linear transform to the coefficients of said set using zero values for the coefficients of the other groups to obtain inverse linear transform results; and
        relating said numerical code to said inverse linear transform results.

10. A method comprising:
    performing an inverse linear transform on blocks of linear transform coefficients by using pre-calculated look-up-tables comprising inverse linear transform results for frequently occurring sets of linear transform coefficients identified without separately identifying particular linear transform coefficients within each of said sets and numerical codes as an index, each set includes a plurality of linear transform coefficients, each set of said coefficients is expressed as a combination of variable-length codes and each numerical code uniquely identifies a particular set based on the combination of variable-length codes associated with said particular set.

11. The method of claim 10, wherein said sets of linear transform coefficients correspond to separate groups of coefficients in said blocks.

12. The method of claim 10, wherein said linear transform coefficients are quantized linear transform coefficients.

13. The method of claim 10, wherein said linear transform coefficients are discrete cosine transform coefficients and said inverse linear transform is an inverse discrete cosine transform.

14. The method of claim 10, wherein said linear transform coefficients are fast Fourier transform coefficients and said inverse linear transform is an inverse fast Fourier transform.

15. The method of claim 10, wherein said linear transform coefficients are discrete wavelet transform coefficients and said inverse linear transform is an inverse discrete wavelet transform.

16. A method comprising:
dividing a block of linear transform coefficients of a data stream into two or more separate groups;
if a numerical code determined from the coefficients in a first group of said groups enables retrieval of inverse linear transform results for said first group from a table for said first group, retrieving said results;
if not, applying an inverse linear transform to the coefficients in said block;
if a numerical code determined from the coefficients in a second group of said groups enables retrieval of inverse linear transform results for said second group from a table for said second group, retrieving said results for said second group;
if not, applying an inverse linear transform to the coefficients in said second group to obtain said results for said second group; and
if inverse linear transform results for said first group have been retrieved from said table for said first group, combining said results for said first group and said results for said second group.

17. The method of claim 16, wherein applying an inverse linear transform to the coefficients in said block comprises using zero values for the coefficients of groups other than said first group.

18. The method of claim 16, wherein said linear transform coefficients are quantized linear transform coefficients.

19. The method of claim 16, wherein said data stream is a video stream.

20. The method of claim 16, wherein said linear transform coefficients are discrete cosine transform coefficients and said inverse linear transform is an inverse discrete cosine transform.

21. The method of claim 16, wherein said linear transform coefficients are fast Fourier transform coefficients and said inverse linear transform is an inverse fast Fourier transform.

22. The method of claim 16, wherein said linear transform coefficients are discrete wavelet transform coefficients and said inverse linear transform is an inverse discrete wavelet transform.

23. The method of claim 16, wherein the linear transform coefficients of said first group represent lower frequencies than the linear transform coefficients of said second group.

24. An article comprising:
a computer-readable medium storing computer instructions that enable a computing unit to:
divide blocks of linear transform coefficients into two or more separate groups, said blocks belonging to a collection of data streams; and for at least one group of said groups,
identify sets of linear transform coefficients that occur frequently in said collection without separately identifying particular linear transform coefficients within each of said sets, each set includes a plurality of linear transform coefficients, each of said sets of coefficients is expressed as a combination of variable-length codes appearing in said data streams;
for each of said frequently occurring sets,
assign a numerical code that uniquely identifies said set based on the combination of variable-length codes associated with said set; and
store, indexed by said numerical code, inverse linear transform results obtained by applying an inverse linear transform to the coefficients in said set.

25. An article comprising:
a computer-readable medium storing computer instructions that enable a computing unit to perform an inverse linear transform on blocks of linear transform coefficients by using pre-calculated look-up-tables comprising inverse linear transform results for frequently occurring sets of linear transform coefficients identified without separately identifying particular linear transform coefficients within each of said sets and numerical codes as an index, each set includes a plurality of linear transform coefficients, each set of said coefficients is expressed as a combination of variable-length codes and each numerical code uniquely identifies a particular set based on the combination of variable-length codes associated with said particular set.

26. The article of claim 25, wherein said sets of linear transform coefficients correspond to separate groups of coefficients in said blocks.

27. An apparatus comprising:
a data compression decoder to perform an inverse linear transform on blocks of linear transform coefficients by using pre-calculated look-up-tables comprising inverse linear transform results for frequently occurring sets of linear transform coefficients identified without separately identifying particular linear transform coefficients within each of said sets and numerical codes as an index, each set includes a plurality of linear transform coefficients, each set of said coefficients is expressed as a combination of variable-length codes and each numerical code uniquely identifies a particular set based on the combination of variable-length codes associated with said particular set.

28. The apparatus of claim 27, wherein said sets of linear transform coefficients correspond to separate groups of coefficients in said blocks.

29. The apparatus of claim 27, wherein said data compression decoder comprises:
memory to store said pre-calculated look-up-tables.

30. A set-top box comprising:
a battery; and
a data compression decoder to perform an inverse linear transform on blocks of linear transform coefficients by using pre-calculated look-up-tables comprising inverse linear transform results for frequently occurring sets of linear transform coefficients identified without separately identifying particular linear transform coefficients within each of said sets and numerical codes as an index, each set includes a plurality of linear transform coefficients, each set of said coefficients is associated with a combination of variable-length codes and each combination is used for a respective numerical code.

31. The set-top box of claim 30, wherein said sets of linear transform coefficients correspond to separate groups of coefficients in said blocks.

32. A digital video disc (DVD) player comprising:
a single tray to hold a digital video disc; and
a data compression decoder to perform an inverse linear transform on blocks of linear transform coefficients by using pre-calculated look-up-tables comprising inverse linear transform results for frequently occurring sets of linear transform coefficients identified without separately identifying particular linear transform coefficients within each of said sets and numerical codes as an index, each set includes a plurality of linear transform coefficients, each set of said coefficients is expressed as a combination of variable-length codes and each numerical code uniquely identifies a particular set based on the combination of variable-length codes associated with said particular set.

33. The digital video disc player of claim 32, wherein said sets of linear transform coefficients correspond to separate groups of coefficients in said blocks.

34. A digital video camera comprising:
a color screen to display video play-back; and
a data compression decoder to perform an inverse liner transform on blocks of linear transform coefficients by using pre-calculated look-up-tables comprising inverse linear transform results for frequently occurring sets of linear transform coefficients identified without separately identifying particular linear transform coefficients within each of said sets and numerical codes as an index, each set includes a plurality of linear transform coefficients, each set of said coefficients is expressed as a combination of variable-length codes and each numerical code uniquely identifies a particular set based on the combination of variable-length codes associated with said particular set.

35. The digital video camera of claim 34, wherein said sets of linear transform coefficients correspond to separate groups of coefficients in said blocks.

36. A multimedia-enabled cellular telephone comprising:
a color display screen; and
a data compression decoder to perform an inverse linear transform on blocks of liner transform coefficients by using pre-calculated look-up-tables comprising inverse linear transform results for frequently occurring sets of linear transform coefficients identified without separately identifying particular linear transform coefficients within each of said sets and numerical codes as an index, each set includes a plurality of linear transform coefficients, each set of said coefficients is expressed as a combination of variable-length codes and each numerical code uniquely identifies a particular set based on the combination of variable-length codes associated with said particular set.

37. The cellular telephone of claim 36, wherein said sets of linear transform coefficients correspond to separate groups of coefficients in said blocks.

38. A multimedia-enabled wireless personal digital assistant (PDA) comprising:
a color display screen; and
a data compression decoder to perform an inverse linear transform on blocks of linear transform coefficients by using pre-calculated look-up-tables comprising inverse linear transform results for frequently occurring sets of linear transform coefficients identified without separately identifying particular linear transform coefficients within each of said sets and numerical codes as an index, each set includes a plurality of linear transform coefficients, each set of said coefficients is expressed as a combination of variable-length codes and each numerical code uniquely identifies a particular set based on the combination of variable-length codes associated with said particular set.

39. The personal digital assistant of claim 38, wherein said sets of linear transform coefficients correspond to separate groups of coefficients in said blocks.

* * * * *